Oct. 25, 1960     A. N. MOORE     2,957,992

HORN RING OR BUTTON LIGHT DIMMER

Filed March 31, 1959     2 Sheets-Sheet 1

Albert N. Moore
INVENTOR.

BY *Clarence A. O'Brien*
*and Harvey B. Jackson*
Attorneys

Oct. 25, 1960  A. N. MOORE  2,957,992
HORN RING OR BUTTON LIGHT DIMMER
Filed March 31, 1959  2 Sheets-Sheet 2

Albert N. Moore
INVENTOR.

United States Patent Office 2,957,992
Patented Oct. 25, 1960

2,957,992
HORN RING OR BUTTON LIGHT DIMMER
Albert N. Moore, South Hill, Va.
(Stop 20, Petersburg Pike, Box 178, Rte. 7, Richmond, Va.)
Filed Mar. 31, 1959, Ser. No. 803,232
8 Claims. (Cl. 307—10)

This invention relates to attachments for motor vehicles and more particularly to an attachment which provides an additional function for the horn ring or horn button.

Briefly, the invention is designed to be an inexpensive device to supplement or replace the conventional dimmer switch in the lighting circuit of a motor vehicle. Since a broad field of application of the invention is with existing motor vehicle lighting systems the ensuing description deals principally with the use of the invention as an attachment for motor vehicles equipped with conventional dimmer switches. However, it is evident that the principles of the invention are applicable equally as well with the attachment installed as original equipment with or without the foot operated dimmer switch. Current regulations in some states require a foot-operated dimmer switch and to satisfy these requirements it is preferred that the dimmer switch be retained. Furthermore, by retention of the dimmer switch an option for use of the attachment or the dimmer switch exists.

The reduction of expense in this attachment referred to above, is in comparison to automatic electronically operated light dimmers provided as an accessory in some motor vehicles and vended under various trade names. Such automatic headlight dimmers have a retail cost in excess of $100.00. They operate by a stimulus obtained from a light sensitive cell. In operation thereof approaching headlights cause the photocell to be energized and automatically dim the lights on the motor vehicle possessing the dimmer. Such equipment is ordinarily provided with an adjustment so that the dimmer may be made more or less sensitive to the light level that is the number of photons received by the light sensitive cell. Even with this available adjustment a serious handicap is that the headlights of the motor vehicles sometimes become lowered when the motorist does not wish them to be lowered. The headlamps will switch from high beam to low beam illumination when, for example, the motorists headlamps shine directly on a reflective surface. Such a reflective surface may be a white house or barn adjacent to the highway or a reflective billboard, especially those having luminescent paint.

Efforts have been made to correct this difficulty. One such effort is to polarize the light falling onto the light sensitive cell. As yet, this has not been deemed to be a successful solution to the problem.

My invention is an attachment which approaches the problem of light dimming by a physical act on the part of the motorist. It does not operate automatically in the sense that the currently available (on some manufacturer's make of vehicles) automatic dimmer operates. Yet, it is a considerable improvement over a foot operated dimmer switch because it provides much greater convenience for the motorist. My attachment is considered to be a device which would be considered between the fully automatic light dimmer and the conventional dimmer switch. It is capable of being constructed at a grossly lower unit cost than the fully automatic light sensitive cell light dimmer and the foot-operated dimmer switch, because of the increased convenience of operation.

There are a number of reasons why the foot-operated dimmer switch may be considered inadequate, not the least of which is that the motorist may have a physical disability making dimmer switch operation difficult or that the motorist may simply prefer the convenience of the use of his horn ring or horn button to lower his lights.

Accordingly, an object of the invention is to provide an attachment for motor vehicle lighting circuits which provides a new function for the horn ring or horn button. Although the words "horn ring" and "horn button" are used interchangeably herein, it is to be clearly understood that what is referred to is the portion of the conventional motor vehicle which is operated to sound the horn of the motor vehicle. From year to year manufacturers change the configuration of the so-called "ring," but this is an arbitrary thing insofar as the invention is concerned. Therefore, the term "horn ring" or "horn button" is intended to mean that portion of the vehicle defined above.

In order to have a general understanding of the invention, a very brief summary is as follows: When the motorist closes the horn switch of the vehicle, by quickly tapping the horn ring and releasing the pressure, the horn does not sound because the attachment cuts out the horn circuit for a brief predetermined period, for example a second or less. This actuation of the horn button causes a relay to be operated, and the relay changes the setting of the light that is, from high beams to low beams. If the operator of the motor vehicle wishes to sound his horn, he simply holds the horn ring for a longer critical period of one second or less and the following sequence takes place. The light relay operates, a timer is energized, after which the horn circuit is closed. In a situation where the motorist has his headlamps in one setting, for instance low beams energized, he wishes to sound his horn and keep the lights low, he rapidly taps the horn ring twice with this as a consequence. The lights will flick to high and even before the lights can achieve full brilliance, they are returned to the low beam setting. If a motorist retains his hand on the horn ring, the horn will then sound because the one second or less waiting period has expired.

In the daytime the light operating section only of the attachment may be cut out by operating a simple switch which, in one practical installation would be the conventional light switch of the motor vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
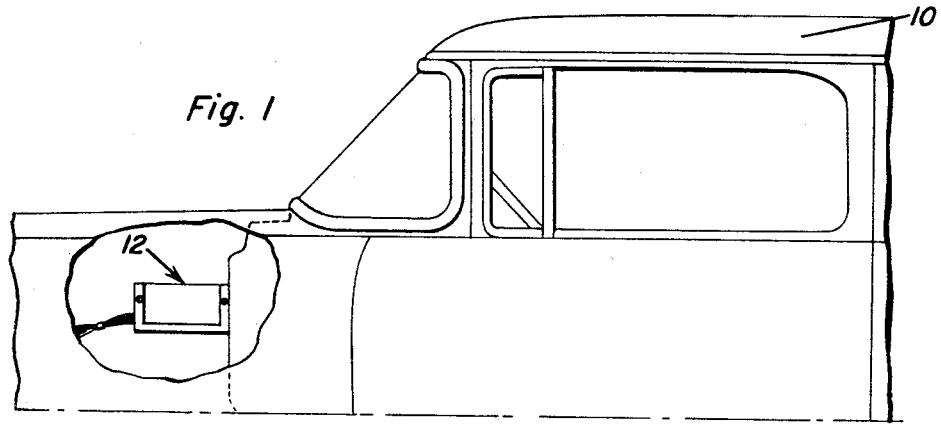
Figure 1 is a fragmentary side elevational view of a motor vehicle showing but one possible place to install the attachment.
Figure 2:
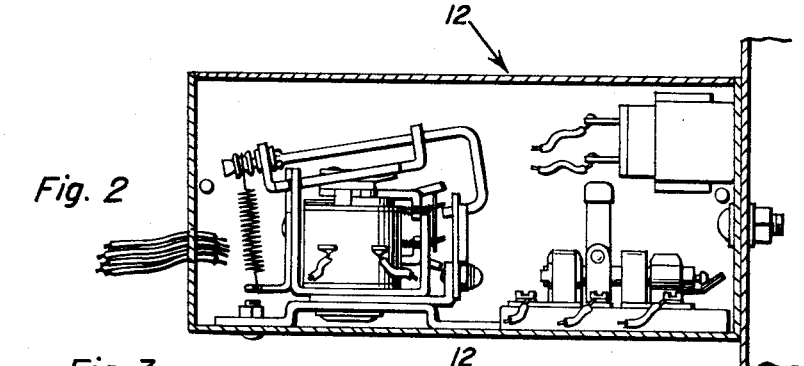
Figure 2 is a sectional view of the attachment showing the interior thereof from one side of the attachment.
Figure 3:
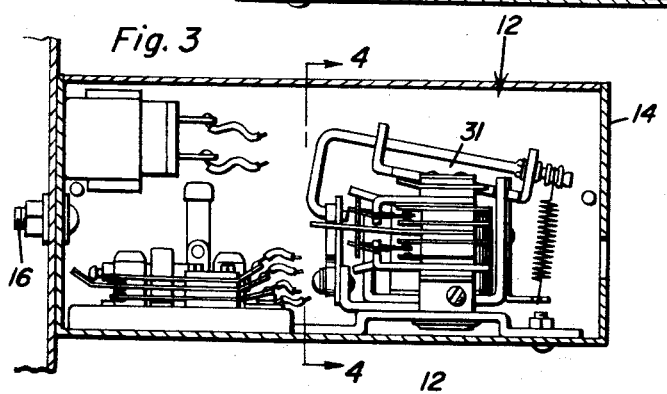
Figure 3 is a sectional view showing the attachment from the opposite side.
Figure 4:
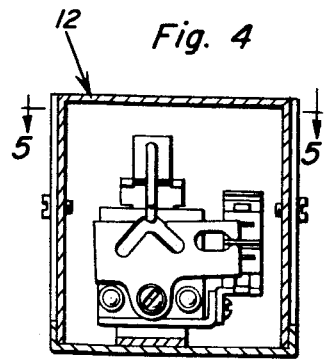
Figure 4 is a sectional view taken on the line 4—4 of Figure 3.
Figure 5:
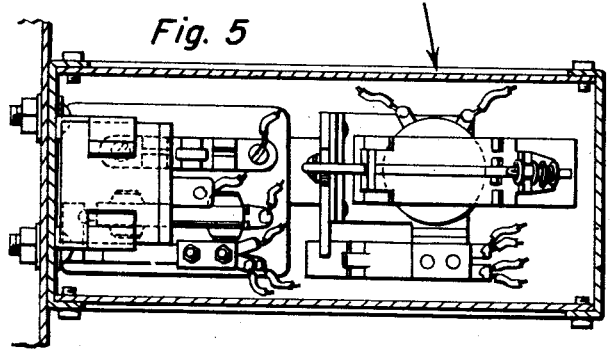
Figure 5 is a sectional view taken approximately on the line 5—5 of Figure 4.

Motor vehicle 10 diagrammatically represents any type of motor vehicle, for instance, a truck, a bus, a passenger car, etc. Attachment 12 is preferably mounted in the engine compartment to facilitate electrical connection with the light circuit in the motor vehicle. Figures 2–4 show the hardware of the attachment mounted in a casing 14 which may be connected by bolt or bolts 16 to the firewall or some other convenient part of the motor vehicle. In one type of installation the mounting of the casing or housing 14 grounds the entire housing to the part on which it is bolted.

Figure 6:
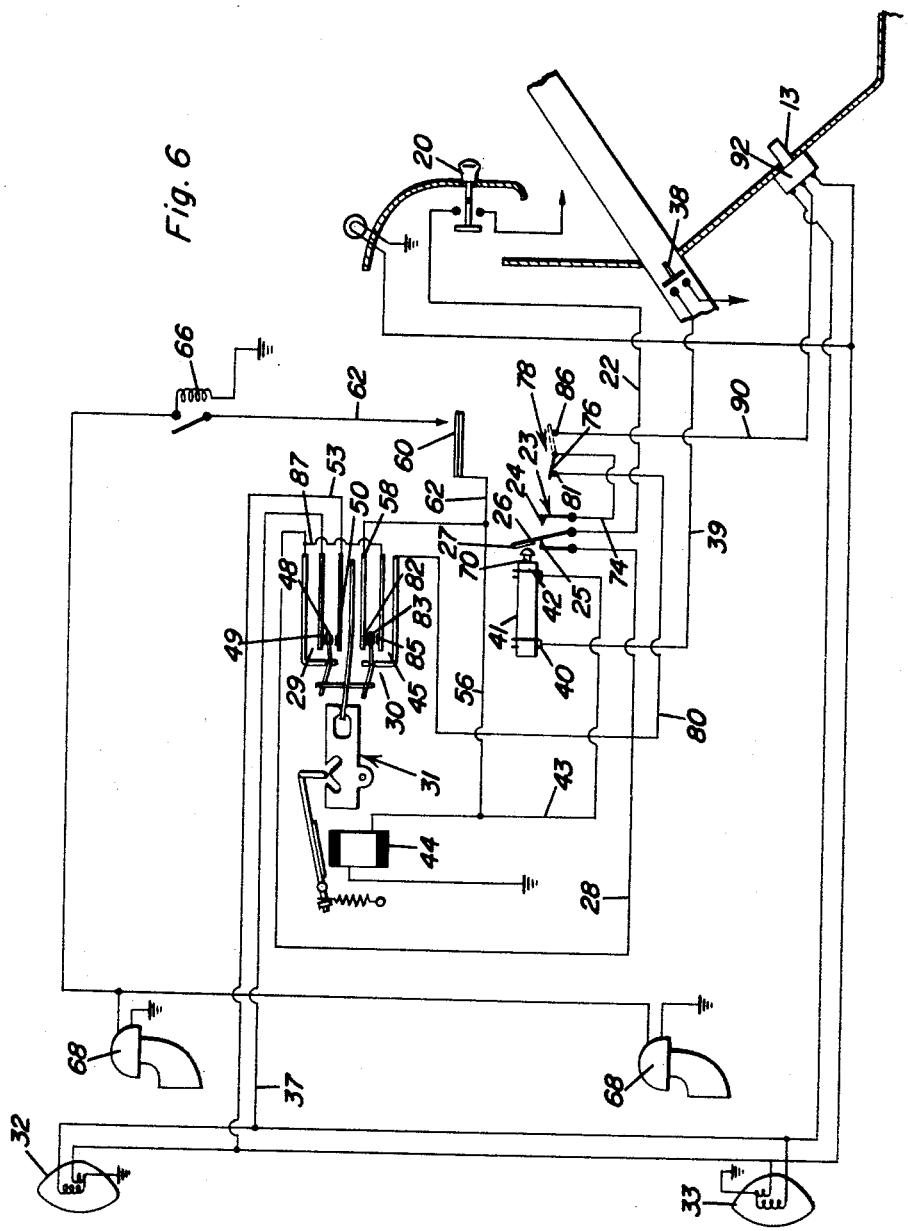
Figure 6 is a diagrammatic view showing the wiring of the attachment and showing further the way that the attachment is integrated with the conventional light circuit in a motor vehicle.

Figure 6 pictorially represents the attachment and various conventional parts of the motor vehicle. Following the circuit will lead to a full understanding of the attachment. A hot terminal or lead in the motor vehicle is selected, for instance the conventional light switch 20 of the motor vehicle may be used. Since this is the primary source, when switch 20 is open, for instance in the daytime, the attachment may be immobilized by simply having the switch opened. Closing the conventional light switch, though, causes conductor 22 to be operatively connected with the source of electrical potential and current is capable of flowing through wire 22 to a special fuse operated switch 23. Switch 23 is a two-position switch having contacts 24 and 25 and a movable contact 26 with an insulatitng pad 27 thereon. Conductor 22 is connected with the movable contact 26, and from the movable contact current flows through conductor 28 to the high beam portion of the switch section 30 of relay 31. This portion of the switch energizes the high beam filaments of headlamps 32 and 33 by way of conductor 37 which is connected with the high beam circuit in the motor vehicle. Portion 29 of switch section 30 will be further mentioned subsequently.

When the conventional switch 38 in the horn circuit of the motor vehicle is closed that is, simply instantaneously closed, current flows from the horn switch 38 which is connected with the available electrical potential of the motor vehicle, through wire 39 to fuse clip 40. Current flows through the fuse 41 and fuse clip 42 to conductor 43 and to the coil 44 of relay 31. This coil is connected to ground thereby energizing the relay having high beam portion 29 and low beam portion 45 in the switch section 30 thereof. Upon energization of the relay, the switch section 30 achieves its second position at which contacts 48 and 49 open and contacts 48 and 50 close. This will cause the initially described circuit to function as follows: Current flows through wire 22, switch 23, wire 28, switch section 29 including contacts 48 and 50, conductor 53 with the result that the low beams in the lamps 32 and 33 become energized because conductor 53 is connected therewith, and the high beam lamp filaments become deenergized because contacts 48 and 49 are opened thereby breaking the high beam lamp circuit.

The previous description sets forth what results with a momentary closing of switch 38. If the horn switch 38 remains closed for a longer period of time which would be one second or less the following takes place: At the time that current flows through conductor 43 to energize coil 44 of the relay, conductor 56 which is connected with conductor 43, at the binding post on the relay 44 or an equivalent connecting point, conducts current to terminal 58 of the switch section 30 of the relay. This causes current to flow through the flasher 60 by way of conductors 62 which is attached to the terminal 58 or wire 56. The flasher 60 is a conventional thermally operated switch so that after a brief period the flasher is actuated. The period of time required for the flasher to operate is made brief because the coil 44 of the relay draws a considerable quantity of current thereby causing the switch of the flasher 60 to close. Electrical conductor 62 is connected with the flasher 60 and with the relay 66 of the horns of the motor vehicle. This relay is operatively connected with the horns 68 in a conventional way in such installations where a relay 66 is used.

The relay may be omitted without loss of function of the attachment. Therefore, since the flasher 66 inherently operates intermittently, the horns 68 will be energized intermittently.

Now consider fuse 41. It is a special fuse, commercially available, which when overloaded, opens and at the same time extends plunger 70, projecting it outwardly from the body of the fuse. This is in alignment with movable contact 26 so that it actuates the switch 24 to the second position at which movable contact 26 touches fixed contact 24. Conductor 74 is connected to fixed contact 24 and to the movable contact 76 of a knife switch 78 or the equivalent. If the knife switch 78 is in the position shown in full line in Figure 6, by following conductor 80 attached to contact 81, current will flow through contact 82 of the switch portion 45 of the relay and then through terminal 58, wire 56 to relay coil 44 causing the section 45 to operate to a position at which contact 83 engages contact 85 of the switch section 45. Then current can flow through jumper 87 to conductor 28 and back to switch 23 which is now open. Current also flows from jumper 87 to and through contacts 48 and 50 and hence to wire 53 and the low beams of the headlights. It is evident that if the fuse 41 blows, with the knife switch 78 as shown and the lights are in a lowered position, there will be no change in the setting of the headlamps. But if the lights are on the high beam setting, they will at once move to a low beam setting, as described below.

Now assume that the fuse 41 blows when the knife switch has its movable contact 76 in the dotted line position that is, bridging contact 86. Current will flow from the source through conductor 22, switch 23, conductor 90 and to the dimmer switch 92. This again mobilizes the dimmer switch 92 so that the motorist may use the dimmer switch as he sees fit and in the ordinary, conventional way.

In a typical installation for a conventional motor vehicle circuit, the attachment 12 is connected in the following way: Conductor 39 is connected with the conventional horn switch 38. Conductor 22 is connected to the conventional light switch 20 of the motor vehicle. Conductor 37 is connected with the conventional high beam filament energizing wire and conductor 53 is connected with the conventional low beam energizing wire. Conductor 90 is connected to the hot terminal of the conventional dimmer switch 92. Conductor 62 is connected with a horn relay when a horn relay is used and otherwise is connected directly with the wire which energizes the horn or horns 68 of the motor vehicle. This is all that is required for hook-up of the attachment in a motor vehicle.

Reference is now made to the configuration of attachment 12. The previously described switches, relay and timer are mounted in the casing so that a contact unit results. The switches and other components are conventional, commercially available parts and may be varied in selection depending largely on dependability and cost and other practical considerations as envelope size. Relay 31 is a latching relay of the type which moves the switch section to successive switch closing positions for the portions 29 and 45 thereof. The flasher is a conventional automotive vehicle type flasher, and aside miniaturization knife switch 78 is ordinary as is switch 23.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. An attachment for a motor vehicle horn switch to change the energization from high beam to low beams in response to momentary closing of the horn switch, said attachment comprising a relay having a switch section with two portions, one of said portions connected with the high and low beam circuits respectively of the lamps, the other of said sections having means connected with the horn circuit of the motor vehicle, time delay device to hold said horn circuit open momentarily so that upon closing of said horn switch said head lamp controlling portion of the relay switch section changes from high beam to low beam energization prior to closing of the horn circuit.

2. The attachment of claim 1 wherein the relay has a coil connected in circuit with said time delay to draw a comparatively heavy current load and accelerate the operation of said time delay means.

3. The attachment of claim 2 wherein said time delay means comprises a thermally operated flasher switch so that upon closing of said horn circuit by retention of the horn circuit switch in a closed position for a predetermined brief period, said horn circuit is intermittently energized by actuation of the flasher.

4. An attachment for a motor vehicle horn switch to change the energization from high beam to low beam in response to momentary closing of the horn switch, said attachment comprising a relay having a switch section with two portions, one of said portions connected with the high and low beam circuits respectively of the lamps, the other of said sections having means connected with the horn circuit of the motor vehicle, time delay device to hold said horn circuit open momentarily so that upon closing of said horn switch said headlamp controlling portion of the relay switch section changes from high beam to low beam energization prior to closing of the horn circuit, a fuse connected between said relay coil and the horn circuit controlling portion of the switch section of the relay and said horn switch, said fuse having a plunger which is moved when the fuse blows, a switch having a movable contact in the path of travel of the plunger and operatively connected between the light controlling portion of said relay switch section and the horn switch and also between the horn circuit controlling section of the relay.

5. An attachment for a motor vehicle which has a conventional dimmer switch, a conventional point circuit controlling switch and conventional high and low beam filaments connected in high and low beam light circuits, and also a conventional horn energizing circuit, said attachment comprising a relay having a coil and a switch section with a first and second portion, said first portion connected in circuit with said high and low beam filament circuits, a control switch, a conductor extending from the source of electrical potential to said control switch and from said control switch to said first relay switch portion and to one set of filaments, another conductor extending from said first portion and to the other filament circuit, said control switch having a contact with the conductor extending therefrom and to the second portion of said relay switch section, a further conductor extending from said second portion to the horn circuit of the motor vehicle so that upon momentary closing of the horn button switch, said relay is energized by way of a conductor connected with the coil of the relay from the source of potential at the horn switch whereby to change the setting of said first portion of said relay switch section and close the horn circuit through said second portion of said relay switch section.

6. An attachment for a motor vehicle which has a conventional dimmer switch, a conventional point circuit controlling switch and conventional high and low beam filaments connected in high and low beam light circuits, and also a conventional horn energizing circuit, said attachment comprising a relay having a coil and a switch section with a first and second portion, said first portion connected in circuit with said high and low beam filament circuits, a control switch, a conductor extending from the source of electrical potential to said control switch and from said control switch to said first relay switch portion and to one set of filaments, another conductor extending from said first portion and to the other filament circuit, said control switch having a contact with the conductor extending therefrom and to the second portion of said relay switch section, a further conductor extending from said second portion to the horn circuit of the motor vehicle so that upon momentary closing of the horn button switch, said relay is energized by way of a conductor connected with the coil of the relay from the source of potential at the horn switch whereby to change the setting of said first portion of said relay switch section and close the horn circuit through said second portion of said relay switch section, a time-delay device interposed between said second portion of said relay switch section and the horn circuit whereby the horn circuit becomes energized when said horn switch is maintained closed for a time sufficient to actuate said time delay.

7. An attachment for a motor vehicle which has a conventional dimmer switch, a conventional point circuit controlling switch and conventional high and low beam filaments connected in high and low beam light circuits, and also a conventional horn energizing circuit, said attachment comprising a relay having a coil and a switch section with a first and second portion, said first portion connected in circuit with said high and low beam filament circuits, a control switch, a conductor extending from the source of electrical potential to said control switch and from said control switch to said first relay switch portion and to one set of filaments, another conductor extending from said first portion and to the other filament circuit, said control switch having a contact with the conductor extending therefrom and to the second portion of said relay switch section, a further conductor extending from said second portion to the horn circuit of the motor vehicle so that upon momentary closing of the horn button switch, said relay is energized by way of a conductor connected with the coil of the relay from the source of potential at the horn switch whereby to change the setting of said first portion of said relay switch section and close the horn circuit through said second portion of said relay switch section, a time-delay device interposed between said second portion of said relay switch section and the horn circuit whereby the horn circuit becomes energized when said horn switch is maintained closed for a time sufficient to actuate said time delay, a selector switch between said dimmer switch and said second portion of said relay switch section, said selector switch being movable to a position at which said dimmer switch is effective to control said filament circuits when said control switch is actuated to one of its positions.

8. The attachment of claim 7 wherein there is a fuse connected between said horn switch and said relay coil, said fuse having a plunger which is moved when the fuse blows out, said plunger arranged to move said control switch in response to movement of said plunger.

No references cited.